United States Patent
Cipolla et al.

[19]

[11] Patent Number: 6,078,495
[45] Date of Patent: Jun. 20, 2000

[54] APPARATUS AND METHOD FOR MOVING KEYBOARD AND DISPLAY FOR ENHANCED COOLING ON PORTABLE COMPUTERS

[75] Inventors: Thomas Mario Cipolla, Katonah, N.Y.; Ramiro Ramirez, Apex, N.C.

[73] Assignee: International Business Machines Corporation, Armonk, N.Y.

[21] Appl. No.: 09/014,535

[22] Filed: Jan. 28, 1998

[51] Int. Cl.[7] .................. G06F 1/16; G06F 1/20; H05K 5/00; H05K 7/20
[52] U.S. Cl. .................. 361/680; 361/681; 361/687; 361/726; 361/727; 361/690
[58] Field of Search .................. 361/680, 679, 361/681, 683, 725, 726, 727, 687, 688, 690, 694, 695; 454/184; 364/708.1

[56] References Cited

U.S. PATENT DOCUMENTS

| | | | |
|---|---|---|---|
| 4,084,213 | 4/1978 | Krichner et al. | 361/684 |
| 4,980,848 | 12/1990 | Griffin et al. | 364/708 |
| 5,576,929 | 11/1996 | Uchiyama et al. | 361/680 |
| 5,612,852 | 3/1997 | Leverault et al. | 361/687 |
| 5,629,832 | 5/1997 | Sellers | 361/680 |
| 5,694,292 | 12/1997 | Paulsel et al. | 361/686 |
| 5,706,167 | 1/1998 | Lee | 361/680 |
| 5,742,475 | 4/1998 | Riddiford | 361/681 |
| 5,754,395 | 5/1998 | Hsu et al. | 361/680 |
| 5,769,551 | 6/1998 | Tsai et al. | 400/489 |

*Primary Examiner*—Benjamin R. Fuller
*Assistant Examiner*—Jagdish Patel
*Attorney, Agent, or Firm*—Ohlandt, Greeley, Ruggiero & Perle, L.L.P.

[57] ABSTRACT

The present invention is a computer arrangement with enhanced cooling capability. The computer arrangement includes a housing having an opening thereon. The housing holds heat generating components, such as a central processing unit and other hardware components and peripheral devices. The computer arrangement further includes a keyboard which is slidably mounted on the housing over the opening, and a display panel which is connected to the keyboard. The keyboard and the display panel are both slidable relative to the opening so as to uncover a portion of the opening to thereby enable an escape of heat from within said housing.

15 Claims, 7 Drawing Sheets

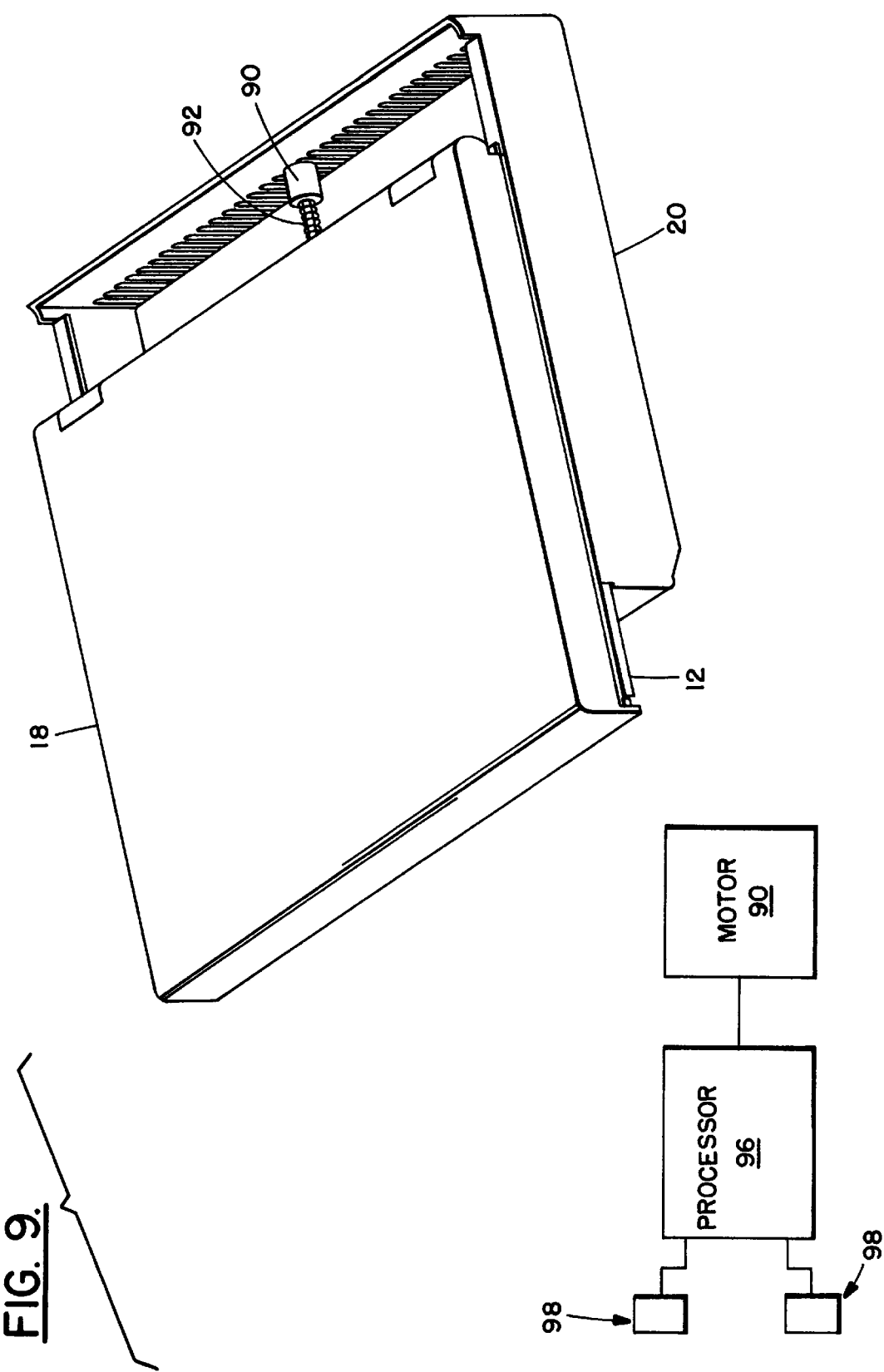

APPARATUS AND METHOD FOR MOVING KEYBOARD AND DISPLAY FOR ENHANCED COOLING ON PORTABLE COMPUTERS

FIELD OF THE INVENTION

The present invention relates to an arrangement for enhancing the cooling capability of portable personal computers (PPCs) and, more particularly, for mechanically exposing heat producing components of portable personal computers, during operation, to a greater amount of ambient air.

BACKGROUND OF THE INVENTION

The capacity and performance of portable personal computers (PPCs), such as laptop computers, notebook computers and the like, have been enhanced to such an extent that thermal dissipation requirements have increased dramatically. Since the beginning of 1996, thermal dissipation requirements of portable personal computers (PPCs) have increased from about 10 Watts to 20 Watts and continue to increase. The increase in thermal dissipation results from increasing CPU performance and additional functionality, such as digital video disk (DVD), modem, audio, video and the like.

As elucidated in an article by Albert Yu, "The Future of Microprocessors", IEEE Micro, December, 1996, pages 46 through 53, the trend of increasing power dissipation in PPCs will continue for the foreseeable future. For instance, the cooling limit for a PPC employing a typical A4 form factor (210 mm width by 297 mm length), without a fan, is currently approximately 15 to 20 watts. Therefore, there is a need to provide improved cooling techniques to meet the anticipated thermal dissipation requirements.

One approach to increasing heat dissipation in a computer is found in U.S. Pat. No. 5,424,913 to Swindler which discloses an access door/heat sink mounted in a portion of a computer housing. Specifically, the access door includes a heat sink having a heat receiving portion positioned to mechanically contact a surface of a heat generating component. The access door further includes a heat dissipating portion forming an outer surface of the access door and capable of dissipating heat received from the component. The heat dissipation technique of the Swindler patent requires the access door to be in contact with the heat generating component. Accordingly, the technique provides limited cooling only to those components in direct contact with the access door and requires the use of thermally transmissible materials.

Another approach is found in U.S. Pat. No. 5,430,609 to Kikinis, which discloses another heat sink arrangement to cool CPUs in portable computers. The Kikinis patent employs a layer of compressible, heat conducting material positioned between the CPU and a heat sink plate. Similar to the Swindler patent, the heat sink plate is part of an access panel of a computer housing. The Kikinis patent requires the CPU to be in thermal contact with the heat sink plate (via heat conducting material and provides cooling only for the CPU.

There is a need to provide a computer arrangement which allows for greater thermal dissipation and cooling of heat generating computer components, without significantly increasing overall size, weight and complexity. There is also a need for a passive cooling arrangement which provides a competitive advantage and a product differentiation from currently available computers.

Accordingly, it is an object of the present invention to provide an arrangement which enhances the heat dissipation of heat producing components in a PPC.

It is a further object of the present invention to increase ambient air flow at and around heat dissipating PPC components.

Another object of the present invention is to increase ambient air flow in a PPC housing without increasing the size and weight of the PPC.

It is also an object of the present invention to provide a latch mechanism for the keyboard and display to prevent a user from interfering with the ambient air flow, during the operation of a PPC.

SUMMARY OF THE INVENTION

The present invention is a computer arrangement with enhanced cooling capability. The computer arrangement includes a housing having an opening. The housing is capable of holding heat generating components, such as a central processing unit and other hardware components and peripheral devices. The computer arrangement further includes a keyboard which is slidably mounted on the housing over the opening, and a display panel which is connected to the keyboard. The keyboard and the display panel are both slidable relative to the opening so as to uncover a portion of the opening to thereby enable an escape of heat from within the housing.

The present invention allows the heat producing components to be exposed to a greater amount of ambient air without increasing the overall size or weight of the PPC. For instance, assuming that the PPC of the present invention is configured with an A4 form factor (e.g., 210 mm width and 297 mm length), exposing 50 mm of the housing's interior can cool an extra 5 watts if the temperature is allowed to rise to 60 degrees Celsius. This represents a 25 to 30 percent increase in passive cooling capacity. As a result, the increased thermal dissipation provided by the present invention provides greater flexibility in hardware design, particularly for PPCs in which space is limited.

The present invention is preferably accomplished through the use of a track and groove system. The PPC keyboard includes a first groove or channel running along a first side edge and a second groove running along a second opposite side edge. The housing includes a first track extending from a side edge of the housing and a second track extending from an opposite edge of the housing. When the keyboard is connected to the housing, the first and second grooves of the keyboard mate with respective first and second tracks. Thus, the keyboard and the display can be slid to uncover at least a portion of the interior of the housing. It is preferred that the keyboard and display be moved in a forward direction toward a user to uncover a back portion of the housing.

The present invention also incorporates a mechanism which automatically slides the keyboard towards a user, if the display panel and keyboard are unlatched from the housing. On a back portion of the keyboard, there is provided a pair of compression spring plungers with capped ends. When the keyboard is mated to the housing and the keyboard and display are in the latched position, the plungers are compressed against the back side wall of the housing. Once the display and keyboard are unlatched from the housing, the plungers decompress and push the keyboard and the display away from the back side wall of the housing.

For the above automatic arrangement, the invention further provides a latching arrangement which prevents the user from covering the opening, during the use of the PPC. That is to say, during the operation of the PPC, the user is prevented from latching the keyboard in a back or latched position to cover the entire opening. To accomplish the foregoing, the housing includes at least one spring loaded latch, and the display panel includes at least one latch tab which is configured to mate with the spring loaded latch. By placing the latch tab on the display panel, a latching operation of the keyboard can only be performed when the display panel is pivoted down closed position over the keyboard. Accordingly, the user is prevented from latching the keyboard to cover the opening, unless the keyboard and display are latched in their respective stowed or carrying positions.

BRIEF DESCRIPTION OF THE DRAWINGS

FIG. 9 illustrates the personal portable computer with a motorized arrangement for automatically controlling the movement of the keyboard and the display.

DETAILED DESCRIPTION OF THE INVENTION

Figure 1:
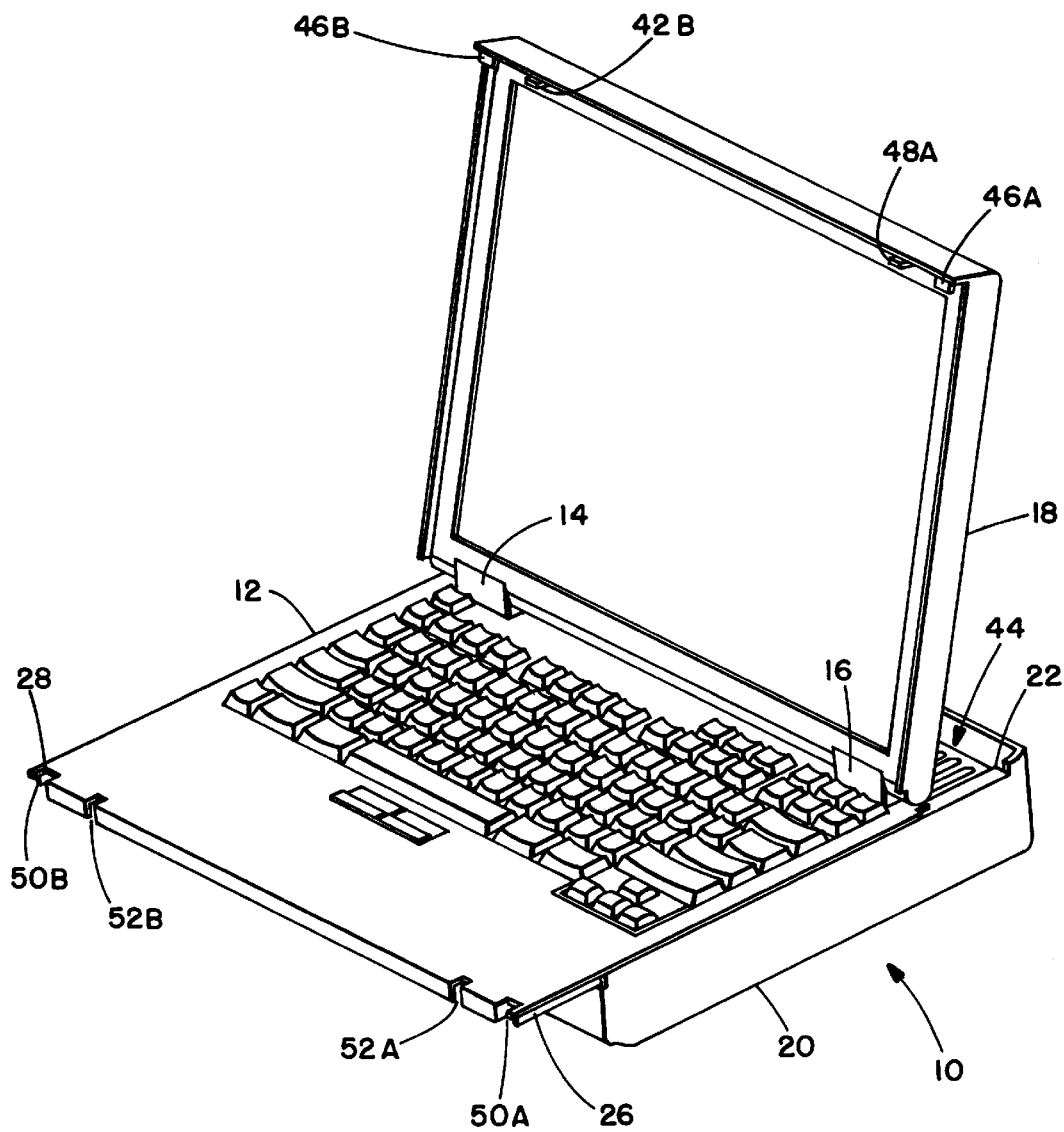
FIG. 1 is an overall isometric view of an open personal portable computer, in accordance with the present invention.

FIG. 1 is an overall isometric view of a personal portable computer (PPC) 10, in accordance with the present invention. PPC 10 includes a keyboard 12, a display panel 18 and a housing 20. Housing 20 holds a plurality of electronic and non-electronic computer components and further includes an opening 44 on a top portion thereof which exposes those components.

Figure 6:
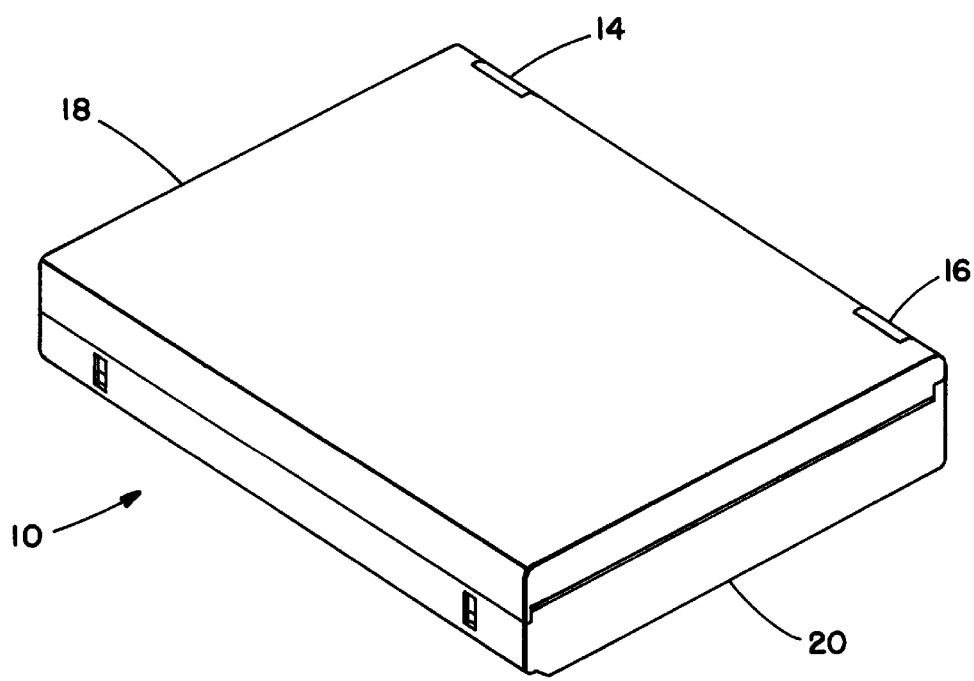
FIG. 6 illustrates the personal portable computer with the display panel in the closed position and the keyboard and display panel in the latched stowed or carrying position.
Figure 5:
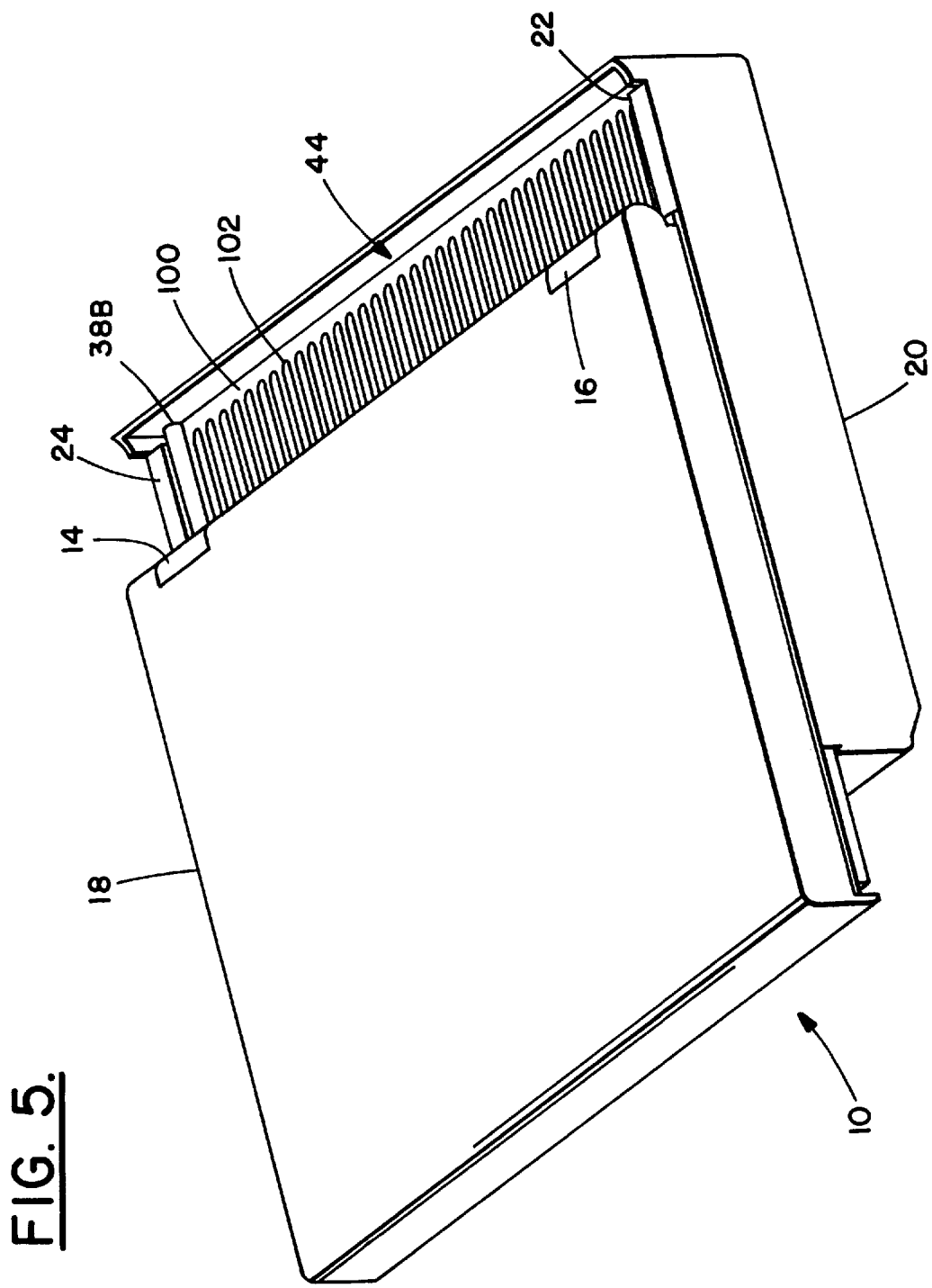
FIG. 5 illustrates the personal portable computer with a display panel in the closed or folded position and the keyboard and display panel in the forward position.

Display panel 18 is pivotably connected proximate to a back edge portion of keyboard 12, by a pair of hinges 14, 16. Display panel 18 is pivotable to an open erect position, as shown, or to a closed or folded position, e.g., where display panel 18 is positioned over keyboard 12 (FIGS. 5 and 6).

The main feature of the present invention resides in a slidable arrangement of keyboard 12 with respect to housing 20. Keyboard 12 is slidably mounted to housing 20 over opening 44 by means of tracks 22 and 24 (not shown) on housing 20 and grooves or channels 26, 28 on keyboard 12. Both keyboard 12 and display panel 18 can thus be slidably displaced with respect to opening 44 to uncover a portion thereof, preferably at a back portion of housing 20. The uncovered portion of opening 44 exposes heat generating components within PPC 10 to ambient air and, thus, enables a greater amount of heat to dissipate from housing 20. This enhanced cooling capability is achieved without significantly increasing the overall size and weight of PPC 10.

Figure 2:
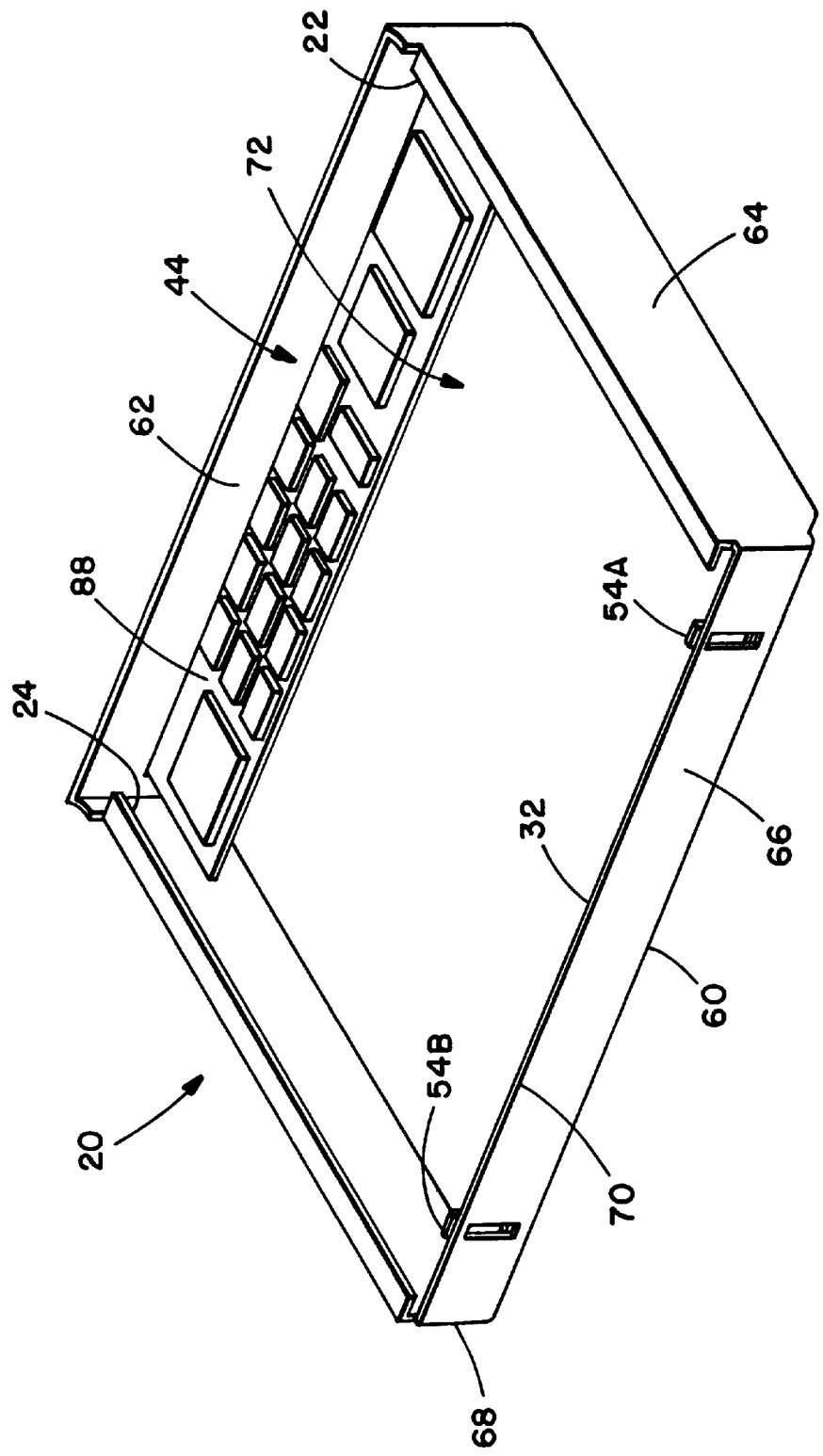
FIG. 2 illustrates a housing for holding electronic components of the personal portable computer of the present invention.

Turning to a more detailed description of the present invention, FIG. 2 illustrates a preferred housing 20. Housing 20 includes a bottom 60 and upwardly extending side walls 62, 64, 66 and 68 that define a cavity 72 for holding various components of PPC 10. Housing 20 further includes a top 70 having opening 44. It is preferred that housing 20 is configured with a size and shape in compliance with the conventional A4 factor (210 mm width and 297 mm length).

Housing 20 further includes first and second tracks 22, 24. First track 22 extends inwardly from a top edge portion of side wall 64 and runs along side wall 64. Similarly, second track 24 extends inwardly from a top edge portion of side wall 68 and runs along side wall 68. First track 22 and second track 24 may both run along an entire length of respective side walls 64, 68 or discontinuously along respective side walls 64, 68.

As indicated above, cavity 72 of housing 20 holds various electronic and non-electronic computer components which are known in the art and will not be discussed in detail herein. However, as generally shown in FIG. 2, it is preferred that the heat generating components, generally denoted by reference numeral 88, be arranged at or near the back portion of housing 20. In fact, such heat generating components 88 are often arranged in the back portion with the connection ports.

Figure 3:
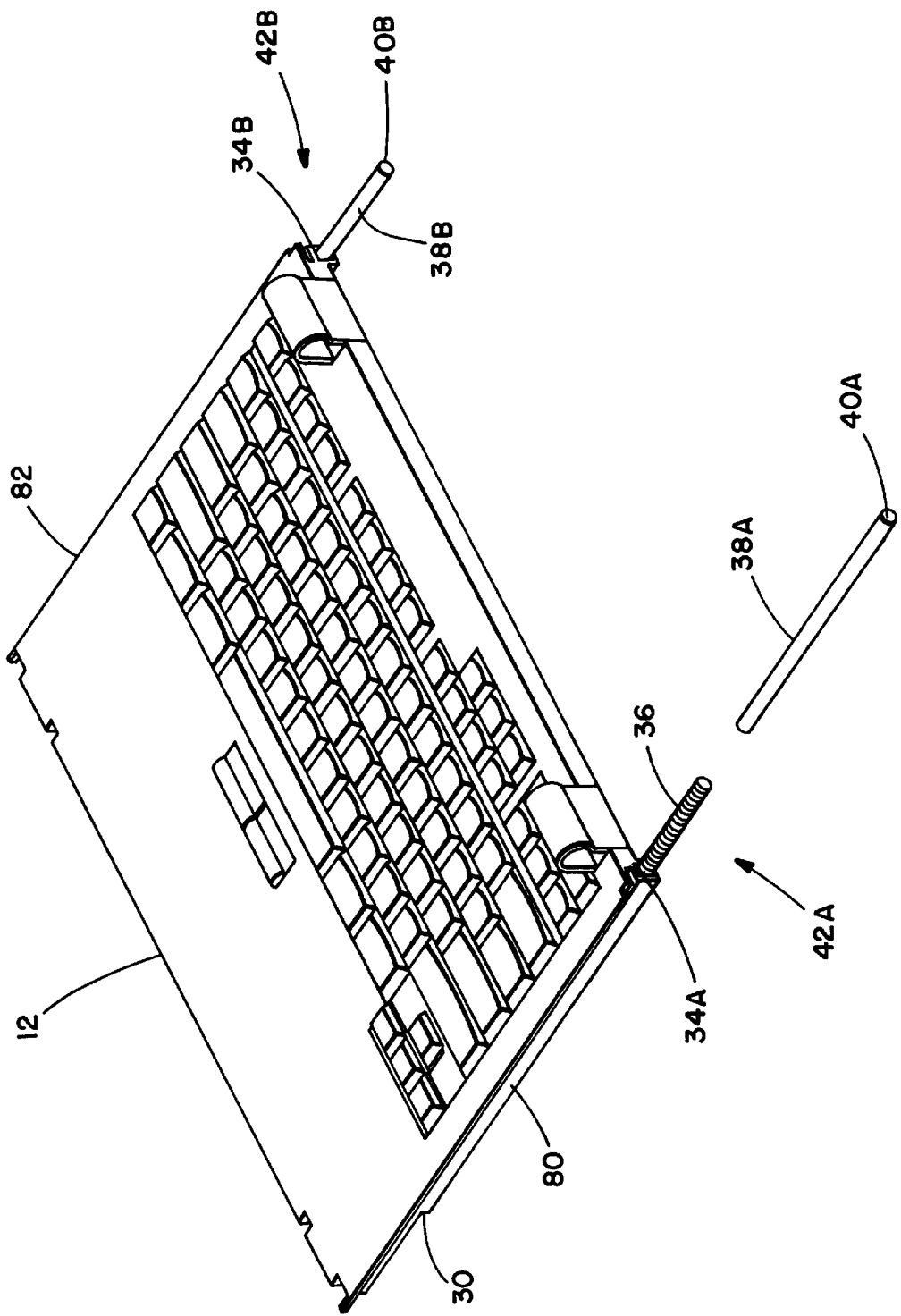
FIG. 3 is a full back view of the keyboard of the present invention.
Figure 4:
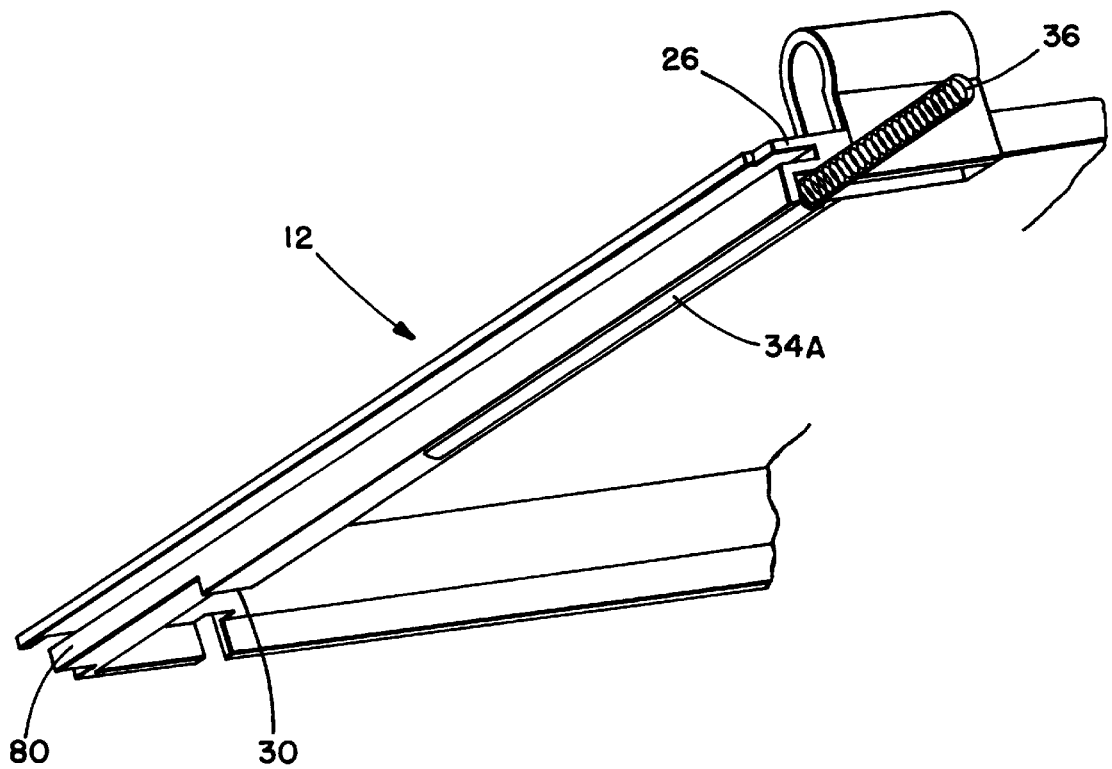
FIG. 4 is a partial back view of a keyboard of the present invention.

FIG. 3 illustrates a full back view of a preferred keyboard 12, and FIG. 4 illustrates a partial back view of keyboard 12 of the present invention. Keyboard 12 (FIG. 4) includes a plurality of keys and may also have mounted thereon other computer input devices, such as a track ball. Keyboard 12 also includes a first side edge 80 having a first groove 26, and a second side edge opposite first side edge 82 having a second groove 28 (not shown) similar to groove 26. It is preferred that grooves 26, 28 run along the entire length of their respective edges. Grooves 26, 28 are configured to mate respectively with tracks 22, 24 of housing 20. When keyboard 12 is connected to housing 20, grooves 26, 28 mate with tracks 22, 24 such that keyboard 12 is slidably mounted to housing 20 over opening 44. These slidable connections allow keyboard 12 to slide forward toward the user and backward away from the user.

Although FIGS. 2, 3 and 4 illustrate grooves 26, 28 and tracks 22, 24 running along the entire length of their respective edges, there are a number of possible variations which provide the same slidable functionality. For instance, grooves 26, 28 can run discontinuously along respective edges of keyboard 12, such that only portions near the front and back of keyboard 12 contact tracks 22, 24. Alternatively, tracks 22, 24 of housing 20 may also run discontinuously along their respective edges with the use of two pins for each track. One pin can be positioned near the front of housing 20, and the other pin can be positioned near the back of housing 20. Another possible arrangement is to reverse the placement of the tracks and grooves so that the tracks are on the housing and the grooves are on the keyboard.

Referring again to FIG. 4, keyboard 12 further includes a mechanism to limit a movement range of the keyboard, particularly in the forward direction toward the user. Keyboard 12 includes at least one ledge or stop 30 (hereinafter "stop 30") downwardly extending from a bottom surface of keyboard 12 and positioned at a predetermined distance from a front edge of keyboard 12. The location of stop 30 defines a front-most slidable position of keyboard 12. That is, in operation, when keyboard 12 is moved to the front-most position, stop 30 contacts front side wall 66 of housing 20 and prevents further forward motion. Stop 30 thus determines the range of allowable forward motion and, correspondingly, the amount of opening 44 which is uncovered.

It is preferred that keyboard 12 includes an additional stop 30 on an opposite side of keyboard 12, such that each side 80, 82 includes a stop 30. It is also preferred that each stop 30 is positioned at a distance of approximately 50 mm from a front edge of keyboard 12. Although the preferred stop arrangement has been described above, stop 30 can be configured in other arrangements. For example, keyboard 12 may include a single stop 30 centrally positioned between sides 80, 82 or may include a plurality of stops 30 uniformly positioned at spaced-apart intervals between sides 80, 82 of keyboard 12.

Keyboard 12 further includes a spring-bias mechanism for automatically sliding keyboard 12 in a forward direction to uncover a portion of opening 44. In particular, two spring plunger assemblies 42A, 42B, preferably identical, run along the bottom side portion of keyboard 12. Plunger assemblies 42A, 42B respectively include tubes 34A, 34B. Tubes 34A, 34B can either be molded into a bottom surface of keyboard 12 as deep blind holes or separate metal or plastic tubes which snap into a pre-configured cavity on a bottom surface of keyboard 12. Plunger assemblies 42A, 42B further include corresponding tubes 38A, 38B, which telescope into tubes 34A, 34B. Each tube 38A, 38B has a capped-off outer end 40A, 40B and holds therein respective compression springs 36.

In operation, when PPC 10 is in the latched position (FIG. 6), spring plunger assemblies 42A, 42B are compressed against back wall 62 of housing 20. Once unlatched, plunger assemblies 42A, 42B decompress and push keyboard 12 toward the forward-most position so as to expose a portion of opening 44, as shown in FIG. 1.

Referring to FIG. 5, PPC 10 preferably includes a grill 100, positioned over opening 44, to protect the internal components of PPC 10 from falling debris, protect users from touching hot components, or the like. Grill 100 preferably includes a plurality of slots 102 which enable ambient air flow and escape of heat from housing 20, when opening 44 is uncovered. As shown in FIG. 5, plurality of slots 102 are preferably longitudinally positioned at spaced-apart intervals. It is preferred that grill 100 is formed of plastic or any other material with low heat conducting qualities.

FIG. 5 further illustrates PPC 10 with display panel 18 in the closed or folded position and both keyboard 12 and display panel 18 in the forward position (e.g., the forward-most position). FIG. 6 illustrates PPC 10 with display panel 18 in the folded position and both keyboard 12 and display panel 18 in the back or latched position (e.g., the stowed or carrying position).

Figure 7:
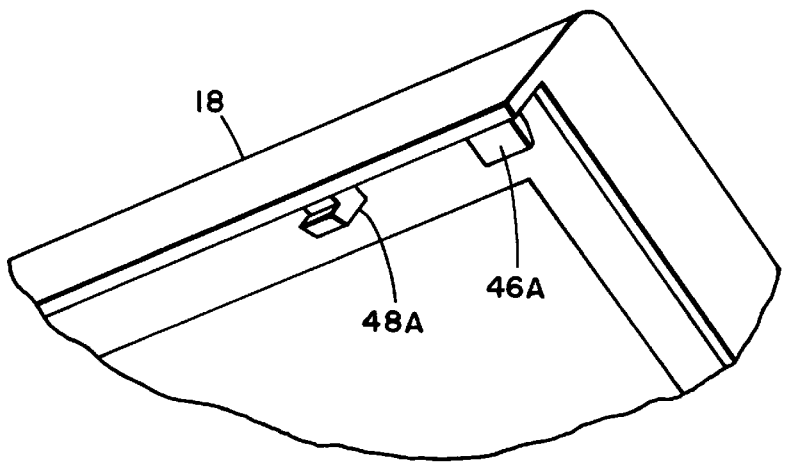
FIG. 7 is a partial view of an upper corner portion of a display panel of the present invention.

FIG. 7 is a partial view of an upper corner of display panel 18. Display panel 18 includes two latch tabs 46A, 48A extending therefrom. When display panel 18 is in the erect, operating position (as shown in FIG. 1), display panel 18 can be pivoted to a closed position (as shown in FIG. 5). As display panel 18 is pivoted to the closed position, tabs 46A, 48A pass respectively through openings 50A, 52A of keyboard 12. Although not shown in FIG. 7, an identical pair of tabs 46B and 48B and openings 50B and 52B are arranged on the opposite side of display panel 18 and keyboard 12.

Figure 8:
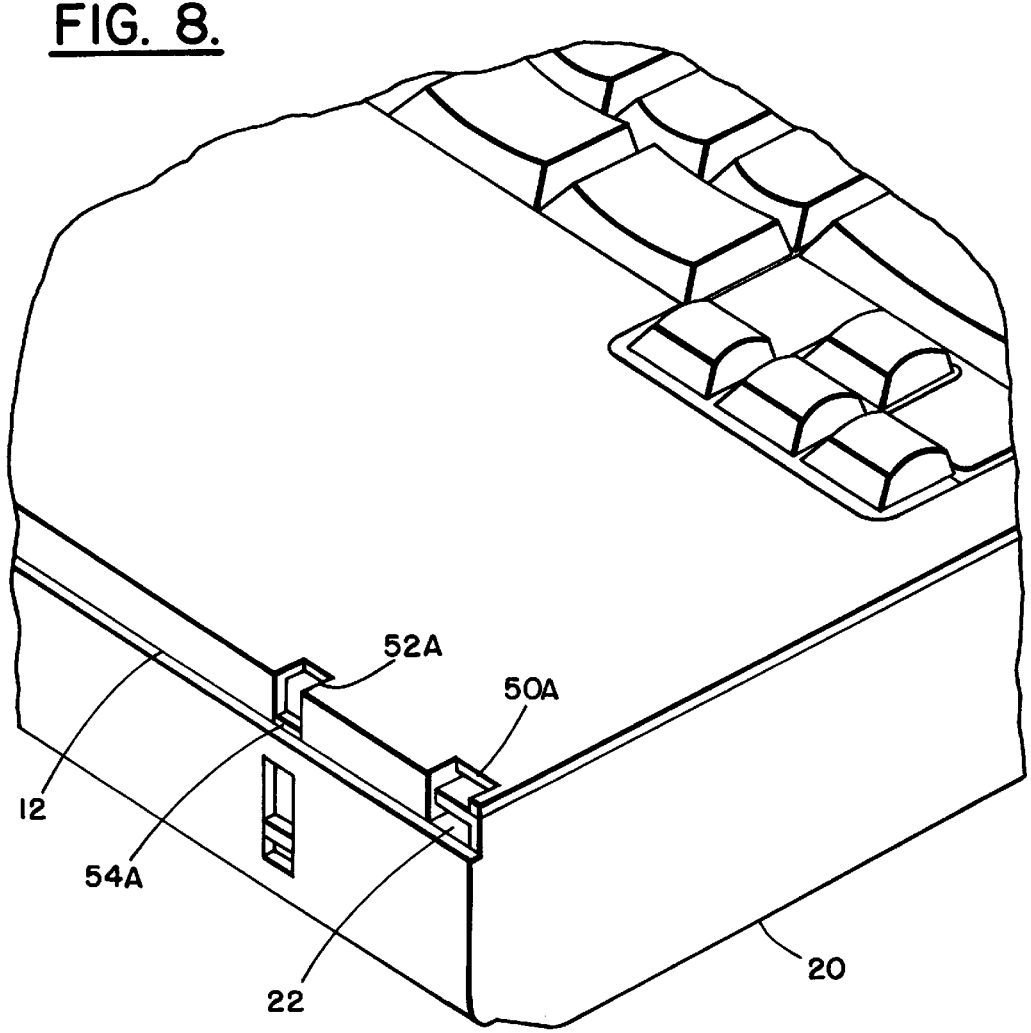
FIG. 8 illustrates the personal portable computer with the keyboard in the back position and the display panel removed for clarity.

FIG. 8 illustrates PPC 10 with keyboard 12 and display panel 18 (not shown) pushed in the back or latched position. Display panel 18 has been omitted from FIG. 8 to show the portion of the latching mechanism on housing 20. Housing 20 includes a spring-loaded latch 54A and a rail 22 arranged on a front side portion of housing 20 and, similarly, a spring-loaded latch 54B and a rail 24 arranged on an opposite front side portion of housing 20 (FIGS. 1 and 8).

When display panel 18 is in the closed position and both display panel 18 and keyboard 12 are slidably moved to the back position (FIG. 6), tab 46A of display panel 18 slips under rail 22 and tab 46B of display panel 18 slips under rail 24. As a result, display panel 18 is prevented from pivoting or opening to the open or erect position. In addition, latch tabs 48A, 48B of display panel 18 lock onto spring loaded latches 54A, 54B respectively. Once locked, display panel 18 and keyboard 12 are prevented from moving in the forward direction (as shown in FIG. 6) and, thus, remain in their stowed or carrying position.

It is important to understand that tabs 46A, 46B, 48A, and 48B are attached to display panel 18. As such, latching in the stowed or carrying position cannot be performed, unless display panel 18 is in the closed or folded position. This latching arrangement in combination with compression spring plungers 42A, 42B (FIGS. 3 and 4) prevent a user from operating PPC 10 with keyboard 12 latched in the back position. Therefore, PPC 10 cannot be operated without the enhanced cooling in effect.

Although the latching mechanism as described in FIGS. 7 and 8 is positioned at a front portion of PPC 10, the latching mechanism may also be arranged on a side portion of PPC 10. Alternative latching or locking mechanisms other than those shown and described herein may also be utilized, in accordance with the spirit of the present invention.

To further understand the present invention, an operational example of the present invention is provided below. Initially, PPC 10 is in the latched position, as shown in FIG. 6. A user pulls down spring loaded latches 52A, 52B to unlatch display panel 18 from housing 20.

Once unlatched, spring plunger assemblies 42A, 42B decompress and push both display panel 18 and keyboard 12 in a forward direction toward the user. As display panel 18 and keyboard 12 slide forwardly, a portion of opening 44 is uncovered. Both display panel 18 and keyboard 12 continue to slide automatically in a forward direction, until stop 30 of keyboard 12 contacts front side wall 66 of housing 20 and prevents any further forward movement (e.g., the front-most position). Display panel 18 can then be lifted or pivoted from the closed position to the erect position.

To close PPC 10 to a carrying position, display panel 18 is downwardly pivoted to the closed position over keyboard 12 (FIG. 5). Both display panel 18 and keyboard 12 are then slidably moved to the back position (FIG. 6) so that tabs 46A, 46B of display panel 18 slip under respective rails 22, 24 of housing 12. Thereafter, latch tabs 48A, 48B of display panel 18 can be locked onto spring loaded latches 54A, 54B respectively. Once locked, display panel 18 and keyboard 12 are prevented from moving in the forward direction (as shown in FIG. 6) and, thus, remain in their stowed or carrying position.

Although various features have been discussed herein, it should be understood to those skilled in the art that additional motion control components may be incorporated into PPC 10 to make the motion more pleasing to the user. For instance, such motion control components may include dampers or shock absorbers. These and other motion control components are known in the art and will not be discussed in further detail.

FIG. 9 illustrates another embodiment for automatically moving keyboard 12 and display 18, in accordance with the present invention. Instead of employing spring plunger assemblies 42A and 42B, stop 30 and latches 54A and 54B as shown in FIGS. 3 and 4, PPC 10 includes a motor 90, a screw shaft 92 and a nut (not shown) attached preferably to an underside of keyboard 12. When PPC 10 is powered to an ON state, motor 90 turns screw shaft 92 to electromechanically drive keyboard 12 and display 18 to the open position, as shown in FIG. 9. Likewise, when PPC 10 is powered to an OFF state, motor 90 drives keyboard 12 and display 18 to the latched position, provided that display 18 is in the closed or folded position. Motor 90 can be controlled by a motor control logic (not shown) which senses whether or not the display is in the folded position by a limit switch (not shown) that is activated by display 12 when in the folded position. Portable personal computers have been known to employ such limit switches, for other purposes outside the scope of the present invention.

Such an arrangement provides the advantage of electronically linking the magnitude of extra cooling capacity, i.e., the distance keyboard 12 and display 18 moves, with an intelligent power management system, such as described in U.S. Pat. No. 5,560,024 to Harper et al. For instance, PPC 10 may include a power management processor 96, coupled to motor 90, for controlling motor 90 and screw shaft 92 to uncover selectively a particular amount of opening 44 according to various power management factors, such as the amount of power being consumed by PPC 10, the temperature in PPC 10, etc. The power management factors may be monitored with the use of various detection or sensor devices 98 which relay relevant information to processor 96.

In summary, the present invention is an arrangement to enhance the passive heat cooling capability of PPCs. This is accomplished through a slidable keyboard and display combination which allows a portion of the housing opening to be uncovered (e.g., a vent). The uncovered portion increases the ambient air at or around the heat generating components and enables a greater amount of heat to escape from the housing. As a result, the improved thermal dissipation arrangement of the present invention allows for greater flexibility in computer design, particularly where the size and shape of the computer unit is limited.

The invention having thus been described with particular reference to the preferred forms thereof, it will be obvious that various changes and modifications may be made therein without departing from the spirit and scope of the invention as defined in the appended claims.

What is claimed is:

1. A computer arrangement with enhanced cooling capability, said computer comprising:

a housing including heat generating components, said housing having an opening;

a keyboard slidably mounted on said housing over said opening;

a display panel connected to said keyboard and including latching means for inhibiting sliding of said keyboard and said display panel, said keyboard having means for biasing said keyboard and said display panel in a slidable direction over said housing to uncover a portion of said opening when said latching means is provided in an unlatched state, thereby enabling an escape of heat from within said housing.

2. The computer arrangement as recited in claim 1, wherein said display panel is pivotably connected to said keyboard.

3. The computer arrangement as recited in claim 2, where said display panel is connected to said keyboard by a hinge.

4. The computer arrangement as recited in claim 3, wherein said hinge connects an edge portion of said display to an edge portion of said keyboard.

5. The computer arrangement as recited in claim 1, wherein said means for latching comprises a spring latch on said housing and a latch tab on said display configured to mate with said spring latch.

6. The computer arrangement as recited in claim 5, wherein said spring latch is arranged on a front end portion of said housing.

7. The computer arrangement as recited in claim 1, wherein said means for biasing comprises a spring compression plunger, positioned at a back portion of said keyboard.

8. The computer arrangement as recited in claim 1, wherein said means for biasing comprises a screw shaft connected to said keyboard and a motor for driving said screw shaft, said shaft being driven in a first direction to uncover said portion of said opening and a second direction opposite said first direction to cover said portion of said opening.

9. The computer arrangement as recited in claim 1, further comprising processor means for controlling said means for biasing to uncover selectively an amount of said portion of said opening, according to power being consumed by said heat generating components.

10. The computer arrangement as recited in claim 1, wherein said housing includes a first track extending from one edge of said housing and a second track extending from an opposite edge of said housing.

11. The computer arrangement as recited in claim 10 wherein said first track and said second track extend along an entire length of their respective edges of said housing.

12. The computer arrangement as recited in claim 10 wherein said first and said second track extend discontinuously along their respective edges of said housing.

13. The computer arrangement as recited in claim 1 wherein said heat generating components are mounted in a back portion of said housing and said portion of said opening is located approximately at said back portion of said housing.

14. The computer arrangement as recited in claim 1, further comprising means for limiting a slidable range of said keyboard relative to said opening.

15. The computer arrangement as recited in claim 14, wherein said means for limiting comprises a stop extending from a bottom surface of said keyboard, said stop positioned at a predetermined distance from a front edge of said keyboard such that said keyboard is prevented from sliding in a forward direction when said stop contacts said housing.

* * * * *